UNITED STATES PATENT OFFICE.

WILLIAM ADAMSON AND CHARLES F. A. SIMONIN, OF PHILADELPHIA, PENNSYLVANIA, ASSIGNORS TO WILLIAM ADAMSON.

IMPROVEMENT IN DRYING OFFAL, ENTRAILS, FLESH, &c., FOR PRESERVATION, MANURE, &c.

Specification forming part of Letters Patent No. 119,000, dated September 19, 1871; reissue No. 5,611, dated October 21, 1873; application filed October 8, 1873.

DIVISION B.

*To all whom it may concern:*

Be it known that we, WILLIAM ADAMSON and CHARLES F. A. SIMONIN, of Philadelphia, county of Philadelphia, State of Pennsylvania, have invented an Improvement in Drying Flesh, Entrails, Offal, &c., for Preservation, Manure, &c., of which the following is a specification:

Our invention consists in depriving animal and fecal substances of all their moisture by subjecting them to the vapors of hydrocarbons in a closed vessel, as explained hereafter.

Oils and fats have been extracted from animal matter by the direct application of liquid hydrocarbons; but this will not effectually remove the watery matter contained in such substances. Fertilizers have also been prepared from offal and fish by passing air or gas, or gas charged with hydrocarbons and phenol vapors, through the mass, and subsequently drying with hot air; but we have found that the most effectual means of drying flesh, offal, &c.—that is, the removal of the water which the substances contain—is by subjecting them in a closed vessel to the direct action of hydrocarbon vapors.

Although different modes of carrying our invention into effect may be adopted, we prefer the following: The animal matter is placed on a perforated diaphragm in a closed vessel, which may be furnished with a suitable safety-valve, and beneath the diaphragm is introduced a supply of hydrocarbon, by preference such as is of a volatile character—benzine, benzole, gasoline, or naphtha, for instance—and this is vaporized by a steam-coil or otherwise. The vapor rises and permeates the flesh or offal, and carries off the watery matter which it contains, and escapes to a condenser, by which the hydrocarbon vapor is liquefied.

The process is conducted, by preference, under more or less pressure, determined by a weighted valve in the pipe, through which the vapor passes to the condenser. The fatty and oily matter of the flesh or offal is also extracted by the hydrocarbon vapors, the extract consisting of liquid hydrocarbon holding fatty and oily matter in solution, which falls to the bottom of the vessel, whence it may be removed from time to time through a suitable discharge-cock, and be redistilled, in order to separate the fats from the hydrocarbons; and this redistillation may, if desired, be conducted in the same vessel in which the extract is obtained.

After the animal matter has been removed from the vessel it will be found to be so effectually deprived, by the action of the vapors, of all moisture that subsequent drying is rendered totally unnecessary, although the product may be exposed for the purpose of permitting all traces of hydrocarbon to evaporate.

We claim as our invention—

The process of drying flesh, offal, &c., by subjecting it, in a closed vessel, to hydrocarbon vapors, as set forth.

In testimony whereof we have signed our names to this specification in the presence of two subscribing witnesses.

WILLIAM ADAMSON.
CHS. F. A. SIMONIN.

Witnesses:
WM. A. STEEL,
HARRY SMITH.